June 8, 1954   E. ST. PIERRE   2,680,361
CARRIER RING FASTENING DEVICE
Filed June 10, 1953
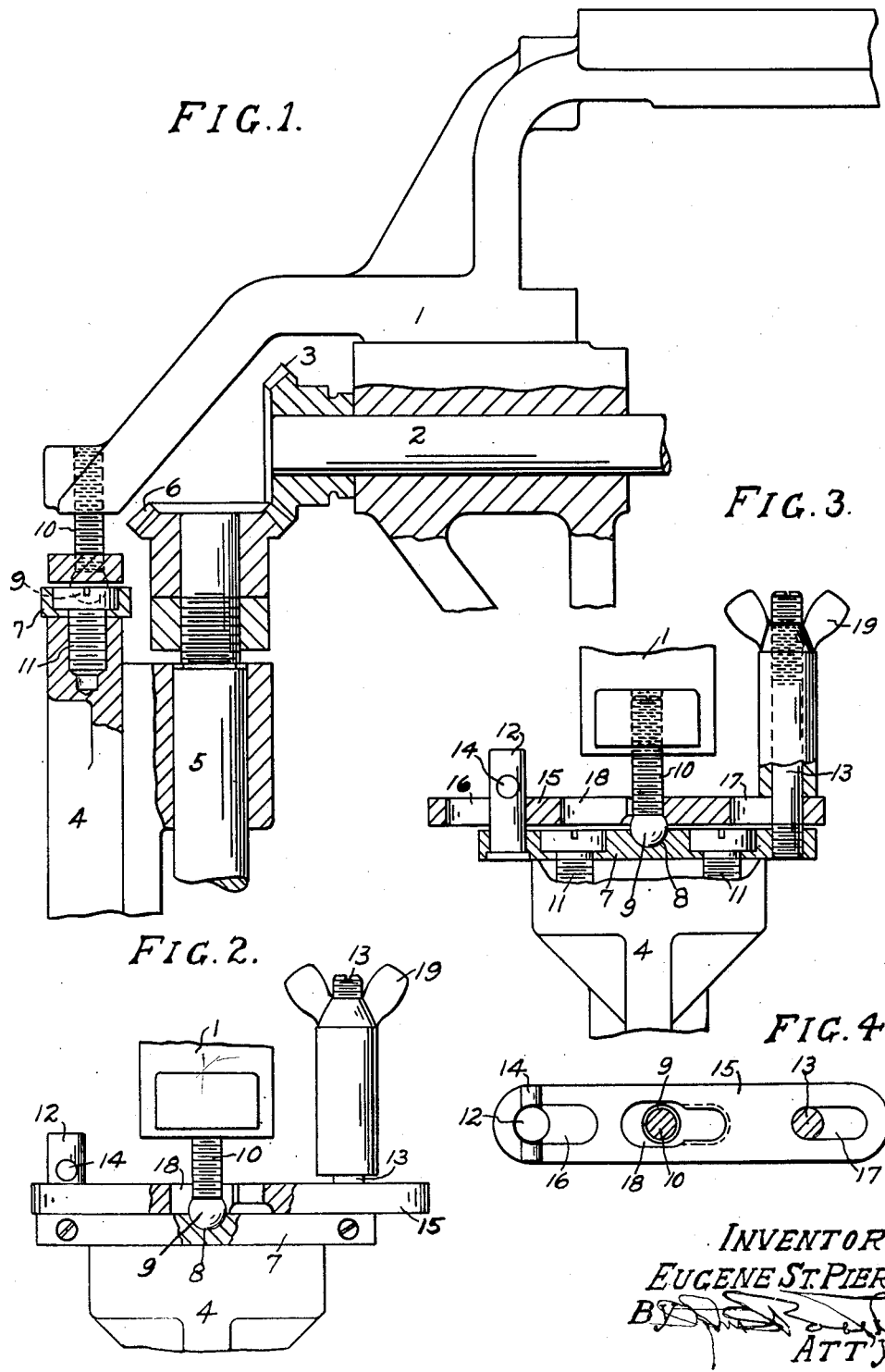
INVENTOR:
EUGENE ST. PIERRE
BY
ATT'Y.

Patented June 8, 1954

2,680,361

UNITED STATES PATENT OFFICE 2,680,361

CARRIER RING FASTENING DEVICE

Eugene St. Pierre, Pawtucket, R. I., assignor to Hemphill Company, Pawtucket, R. I., a corporation of Massachusetts Application June 10, 1953, Serial No. 360,683

6 Claims. (Cl. 66—28)

This invention relates to circular knitting machines of the dial and cylinder type and has particular reference to an improvement in the means by which the carrier ring is coupled to a bracket on the circular base.

In such machines, the dial is conventionally mounted on the lower end of a vertical shaft, the upper end of which is connected through bevel gears to a horizontal shaft and this, in turn, is connected through bevel gears to another vertical shaft from which the power to drive the dial is derived. The last mentioned shaft is usually held in a rigidly mounted bracket, whereas the other shafts and the dial are supported by a bracket bolted to the carrier ring which is pivoted so that it and the dial and dial bracket may be swung upwardly to give access to the upper end of the cylinder. Thus, the bevel gears connecting the horizontal shaft and the rigidly supported vertical shaft are separable and are in engagement only when the carrier ring and, consequently, the dial and its bracket have been lowered into operating position.

The relation between the dial and cylinder needles is extremely critical and it is essential that, once this relation has been correctly established, it can be re-established automatically no matter how often the carrier ring is swung out of and into operating position. This is accomplished by this invention which insures that the relationship between the dial and cylinder and the meshing of the bevel gears will be definitely re-established whenever the carrier ring is in operating position.

Heretofore, it has been customary to limit the downward swing of the carrier ring by an upwardly extending stop and to hold the carrier ring in its down position by means of a wing nut or other similar device positioned an inch or so beyond the stop. The duplication of the operating relationship between the dial and the cylinder and the proper meshing of the bevel gears with such an arrangement depends entirely upon the ability of the operator to tighten the wing nut to exactly the same degree repeatedly. Obviously, this is humanly impossible. Variations in the tightness of the wing nut will result in variations in the relative positions of the dial mechanism and cylinder and in the meshing of the gears. If the wing nut is tightened too much, it may warp the carrier ring sufficiently to throw the entire dial mechanism out of line and possibly cause the bevel gears to bind. It will also tend to cause the carrier ring and the dial mechanism which it carries to tilt if there happens to be lost motion in the carrier ring pivot as is usually the case. All of these difficulties are eliminated by the present invention which provides a positive, reliable and accurate coupling which will automatically preserve the necessary relationships regardless of how many times the carrier ring is raised or how carelessly it is fastened down.

An embodiment of the invention is shown in the accompanying drawings of which:

Fig. 1 is a side view, partly in section, of the connecting device of the invention;

Fig. 2 is another view of the connecting device, showing the ball and socket in "unlocked" position;

Fig. 3 is a side view similar to Fig. 2 showing the ball and socket in "locked" position; and Fig. 4 is a top view of the key plate employed as a locking member.

Referring to Fig. 1, a dial bracket 1, mounted upon a pivoted carrier ring, supports a horizontal dial shaft 2 which carries bevel gear 3. A bracket 4 mounted on the circular base supports a vertical drive shaft 5 which carries a bevel gear 6 adapted to engage gear 3. Bracket 4 carries at its upper end plate 7 having a ball socket 8 (Figs. 2 and 3) adapted to receive a ball 9 which forms the head of a stud 10 threaded into bracket 1. Plate 7 is adjustable on bracket 4 by means of screws 11 so that socket 8 can be aligned with ball 9 and the effective length of stud 10 can be varied so that the position of the carrier ring is adjustable. Adjacent the ends of plate 7 are upright studs 12 and 13. Stud 12 has a crosspiece 14 spaced from the upper surface of plate 7 sufficiently to provide a sliding fit between plate 7 and a plate 15. Plate 15 is provided with slots 16 and 17 through which studs 12 and 13 pass, so that plate 15 can slide upon plate 7 as just described.

In the mid-portion of plate 15 is a keyhole aperture 18, the forward part of which is wide enough to permit the passage of ball 9 into socket 8 which is registerable with this part of aperture 18. The remainder of aperture 18 is wide enough to accommodate stud 10 but is narrower than ball 9. The relative proportions of plate 7 and ball 9 are such that, when plate 15 is slide towards stud 12 to cause the narrow part of aperture 18 to register with socket 8, the underside of plate 15 will engage the upper part of ball 9 aand confine it within socket 8, as shown in Fig. 3.

Stud 13 is threaded to receive wing nut 19 by which plate 15 can be forced toward plate 7.

Since plate 15 at the narrow part of aperture 18 is designed to engage the upper part of ball 9 when the ball is seated in socket 8, such tightening of wing nut 19 will seat ball 9 firmly in socket 8. Any additional unnecessary tightening of wing nut 19 will merely add to the pressure upon ball 9 without affecting its position or the position of the other related parts. The carrier ring and the dial and dial bracket mounted upon it are securely held in the positions determined by stud 10. Whenever it is desired to raise the carrier ring, all that is necessary is to slide plate 15 in the other direction so that the larger part of aperture 18 registers with socket 8 whereupon the ball can pass from the socket through the aperture. Consequently, this invention provides a simple, inexpensive and nearly fool-proof means for obtaining, repeatedly, the desired positions of several parts having critical requirements.

I claim:

1. In a circular, independent needle, knitting machine of the dial and cylinder type, a dial drive assembly which includes a vertical drive shaft with a bevel gear, a horizontal drive shaft with a bevel gear adapted to mesh with said vertical gear, a vertical shaft supporting bracket, a horizontal shaft supporting bracket, a ball headed stud on one of said brackets, a ball receiving socket on the other of said brackets, a slidable key member for engaging said ball, and means for applying pressure to said key member to force said ball into said socket thereby securing a proper meshing of said gears.

2. The invention according to claim 1 and wherein said ball headed stud is adjustably mounted on its bracket.

3. The invention according to claim 1 and wherein said socket is integral with a separate member adjustably mounted on its bracket.

4. A dial drive assembly for a knitting machine which comprises a vertical drive member, a horizontal drive member adapted to engage said vertical drive member, and a ball and socket device for insuring that said members engage in proper relationship.

5. In a dial drive assembly for a circular knitting machine of the dial and cylinder type having a vertical drive and a horizontal drive, a vertical bracket carrying said vertical drive, a horizontal bracket carrying said horizontal drive, and a ball and socket device connecting said vertical and horizontal brackets.

6. The invention according to claim 5 and wherein said ball and socket device is adjustable.

References Cited in the file of this patent

UNITED STATES PATENTS

| Number | Name | Date |
|---|---|---|
| 1,356,092 | Scott | Oct. 19, 1920 |
| 1,825,370 | Smith | Sept. 29, 1931 |
| 1,893,589 | La Montagne | Jan. 10, 1933 |
| 2,523,460 | Wilson | Sept. 26, 1950 |